US006724147B2

(12) United States Patent
Moench et al.

(10) Patent No.: US 6,724,147 B2
(45) Date of Patent: Apr. 20, 2004

(54) HIGH-PRESSURE GAS DISCHARGE LAMP WITH COOLING ARRANGEMENT

(75) Inventors: Holger Moench, Vaals (NL); Hanns Ernst Fischer, Stolberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/204,746

(22) PCT Filed: Jan. 8, 2002

(86) PCT No.: PCT/IB02/00034

§ 371 (c)(1), (2), (4) Date: Aug. 23, 2002

(87) PCT Pub. No.: WO02/056334

PCT Pub. Date: Jul. 18, 2002

(65) Prior Publication Data

US 2003/0034737 A1 Feb. 20, 2003

(30) Foreign Application Priority Data

Jan. 10, 2001 (DE) ........................................ 101 00 724

(51) Int. Cl.[7] ............................ B60Q 1/02; H01J 17/22
(52) U.S. Cl. ......................................... 315/82; 313/545
(58) Field of Search ............................ 315/77, 80, 82; 313/545, 547, 552, 565, 637; 307/10.1; 362/345, 373, 547

(56) References Cited

U.S. PATENT DOCUMENTS 5,949,192 A * 9/1999 Kominami et al. ........... 315/94
5,952,768 A 9/1999 Strok et al. ................. 313/110
6,084,351 A * 7/2000 Kai et al. ................... 313/634
6,124,679 A * 9/2000 Vrionis ....................... 315/248
6,294,870 B1 * 9/2001 Kawashima et al. ........ 313/623

FOREIGN PATENT DOCUMENTS

JP 652836 2/1994 ............ H01J/61/52

OTHER PUBLICATIONS

Patent Abstracts of Japan; vol. 018, No. 275 (e–1553), May 25, 1994, JP 06052836A.

* cited by examiner

*Primary Examiner*—Hoanganh Le
*Assistant Examiner*—Minh D A

(57) ABSTRACT

A high-pressure gas discharge lamp with a cooling arrangement is described, which is characterized in particular in that the lamp can be operated at an increased power, an increase in the temperature of the coldest spot in the lamp interior generating a higher gas pressure, while the cooling arrangement (7, 71, 83, 82) is constructed and dimensioned such that a devitrification of the lamp bulb and a condensation of the filling gas are substantially prevented at said increased power. A lighting unit with such a high-pressure gas discharge lamp is further described, as is a power supply unit for operating the lamp. This not only considerably improves the spectral properties of the light, but the lamp also operates at a higher operating voltage because of the higher gas pressure, so that a correspondingly higher lamp power is achieved for a given lamp current. On the other hand, given the same lamp power, a weaker current is required, so that the electrodes will have a substantially longer useful life. All this is achieved without any change in the geometry of the lamp.

21 Claims, 1 Drawing Sheet

HIGH-PRESSURE GAS DISCHARGE LAMP WITH COOLING ARRANGEMENT

FIELD OF THE INVENTION

The invention relates to a high-pressure gas discharge lamp with a cooling arrangement, and to a lighting unit comprising such a lamp.

High-pressure gas discharge lamps (HID [High Intensity Discharge] lamps) and in particular UHP (Ultra High Performance) lamps are preferably used inter alia for projection purposes because of their optical properties.

BACKGROUND OF THE INVENTION

A light source which is as point-shaped as possible is required for these applications, i.e. the light arc arising between the electrode tips should not have a length which exceeds a value of approximately 0.5 to 2.5 mm. Furthermore, a luminous intensity which is as high as possible is desired, accompanied by as natural a spectral composition of the light as possible.

These properties can be optimally achieved with UHP lamps. In the development of such lamps, however, two essential requirements must be complied with simultaneously.

On the one hand, the highest temperature at the inner surface of the discharge space must not become so high that a devitrification occurs of the lamp bulb, which is usually manufactured from quartz glass. This may be a problem because the lamp is particularly strongly heated in the region above the light arc owing to the strong convection inside the discharge space.

On the other hand, the coldest spot on the inner surface of the discharge space (or burner space) must still have a temperature which is so high that the mercury is not deposited there, but remains in the evaporated state to a sufficient degree. This is to be heeded in particular in the case of lamps with a saturated gas filling.

These two mutually conflicting requirements have the result that the maximum admissible difference between the highest and the lowest temperature (usually of the upper and lower inner surfaces of the discharge space) is comparatively small. Complying with the maximum for this difference is comparatively difficult, and narrow limits are imposed on a power rise of the lamp because it is mainly the region above the discharge space which is heated by the interior convection, and the temperature thereof can be reduced to a limited degree only through a suitable shaping of the lamp bulb.

Finally, these requirements often cause a problem also if the light output of the lamp is to be dimmed, because this leads to a cooling-down and condensation of the gas, and accordingly to a degradation of the spectral properties of the generated light in most cases.

SUMMARY OF THE INVENTION

It is accordingly an object of the invention to provide a high-pressure gas discharge lamp of the kind mentioned in the opening paragraph, and in particular a UHP lamp suitable for projection purposes, whose spectral properties are clearly improved over a wider power range.

A further object is to provide a lighting unit with a high-pressure gas discharge lamp as well as a power supply unit by means of which such a lamp can be operated such that its spectral properties are clearly improved over a wider power range.

The object mentioned first is achieved, according to claim 1, by means of a high-pressure gas discharge lamp with a cooling arrangement, which is characterized in that the lamp can be operated at an increased power level such that an increased gas pressure is generated by an increase in the temperature (in general of the coldest spot) in the lamp interior, while the cooling arrangement is positioned and dimensioned such that a devitrification of the lamp bulb and a condensation of the filling gas are substantially prevented at said increased power level.

An essential advantage of this solution is that not only the spectral properties of the light are clearly improved, but also that the lamp operates as a higher operating voltage because of the higher gas pressure, so that a correspondingly higher lamp power is achieved for a given lamp current. On the other hand, a smaller current is required for a given lamp power. The result of this is that the electrodes, which are normally subjected to a particularly strong wear in the case of the electrode distances of approximately 0.5 to 2.5 mm which are of interest for projection applications, now have a substantially longer operational life. All this can be achieved without any change in the geometry of the lamp.

The second object mentioned above is achieved, according to claim 7, by means of a lighting unit comprising a high-pressure gas discharge lamp according to the invention as well as a power supply unit for operating the lamp, characterized in that the power supply unit comprises a first control circuit for supplying the lamp with a power at which an increased gas pressure is generated through an increase in the temperature (in general of the coldest spot) in the lamp interior, said first control circuit comprising an output terminal to which an information signal relating to the level of the lamp voltage is applied and which is arranged so as to be connected to a second control circuit for operating a power source which generates the flow of cooling agent in dependence on the level of the lamp voltage such that both a devitrification of the lamp bulb and a condensation of the filling gas are substantially prevented.

It is an advantage of this solution that the lamp and the cooling arrangement can be operated in a manner such that they are mutually attuned. This relates in particular to the adjusted output power of the lamp and the lamp voltage, because the latter is dependent on the gas pressure in the lamp, so that the luminous output power can be increased by a factor of between approximately 1.5 and 3 as compared with the rated power of the lamp without cooling and without a devitrification of the lamp bulb being observable.

It should be noted here that a halogen metal-vapor lamp is known from JP-6-52836, which lamp comprises an air channel by means of which an air flow is directed to an upper portion of the outer surface of a luminous tube. The object of this air flow is to prolong the operational life of the lamp by means of a temperature distribution which is as homogeneous as possible. Apart from the fact that an improvement in the spectral properties of the light cannot be achieved thereby, there is also a problem here that the temperature of the coldest spot is particularly sensitive to any air flow because the temperature gradient in situ (i.e. at the lower side of the lamp bulb) is substantially narrower than at the upper side. The admissible range for the air flow by which no condensation of mercury is caused is accordingly very narrow, so that high requirements are imposed on the accuracy of the cooling system and narrow tolerances are to be observed. On the other hand, the spectrum of the radiated light and the burning voltage are even impaired and reduced, respectively, owing to the condensation of mercury. It is further proposed to provide a glass plate in horizontal position in the reflector so as to prevent an undesirable cooling-down of the lower side of the lamp. This measure, however, not only involves a considerable expenditure, but it also adversely affects the optical output power of the lamp.

The dependent claims relate to advantageous further embodiments of the invention.

The embodiment of claim 2 is particularly advantageous in the case in which the lamp power is adjustable.

The effectiveness of the cooling is further improved with the embodiments as defined in claims 3 to 6, so that the lamp power can be further increased or the lamp current can be correspondingly reduced, while at the same time the spectral properties of the light are further improved.

The embodiment of claim 8 relates to a complete lighting unit with a power supply unit for the lamp as well as for the cooling arrangement, so that economic advantages arise from the integration.

The embodiment of claim 9 involves an optimization of the cooling in dependence on the output power of the lamp, so that according to claim 10 also dimming of the output power is possible without detracting from the spectral properties of the light. The embodiments of claims 11 and 12 have particular advantages as regards a fast switching-on and restarting of the lamp.

BRIEF DESCRIPTION OF THE DRAWINGS

Further details, features, and advantages of the invention will become apparent from the ensuing description of a preferred embodiment which is given with reference to the drawings, in which.

DETAILED DESCRIPTION OF THE PREFERRED EMBODIMENTS

Figure 1:
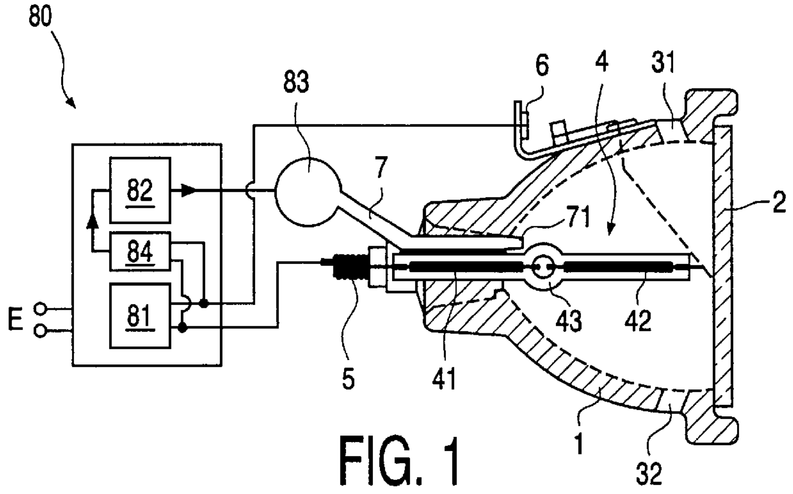
FIG. 1 is a diagrammatic cross-sectional view of a UHP lamp.

FIG. 1 is a diagrammatic cross-sectional view of a UHP lamp according to the invention with a reflector housing 1 whose opening is preferably closed off with a front disc 2. The front disc 2 forms a light emission surface and serves to protect the environment in the case of a lamp breakdown. It may also be constructed as a filter disc for the generated light. A plurality of air vents 31, 32 is arranged in the region of the opening of the reflector housing 1 along the circumference thereof.

An electrode arrangement 4 extends from the end of the reflector housing remote from the opening into said housing. The electrode arrangement 4 comprises substantially a first electrode 41 and a second electrode 42 which are present in a lamp bulb 43 and between whose mutually opposed tips a light arc discharge is excited in a burner space (or discharge space) of the lamp bulb. The respective other ends of the electrodes 41, 42 are connected to electrical connections 5, 6 of the lamp through which the supply voltage necessary for operating the lamp is supplied by a power supply unit 80.

An air channel 7 with an outlet nozzle 71 extends furthermore next to the electrode arrangement 4 into the reflector housing 1. The air channel 7 is connected to an air pressure source 83 so that an air flow can be directed through the outlet nozzle 71 to the burner space 431, which air flow leaves the reflector housing 1 again through the air vents 31, 32.

A particular advantage of this construction is that the air channel 7 lies outside the light cone of the lamp, so that no appreciable light losses occur. Furthermore, the air channel 7 can be introduced into the reflector housing 1 together with the electrode arrangement 4 in a simple manner from the rear and can be mounted.

Alternatively to the picture in FIG. 1, the air channel 7 may be introduced through an additional opening in the reflector housing 1 above the region of the burner space, and the air flow may be aimed at this region from that direction.

Finally, it is also possible to arrange elements for suitably influencing the air flow in the interior of the reflector housing 1 so as to enhance the effectiveness of the air flow in this manner.

The lamp according to the invention is preferably operated from the power supply unit 80 which comprises an input terminal E for a public mains voltage. It comprises a first control circuit 81 for supplying the lamp and a second control circuit 82 for operating a source 83 which generates the air flow. Furthermore, a monitoring and control device 84 is provided by means of which the lamp voltage applied to the lamp is measured. Alternatively, the second control circuit 82 may be combined with the source 83 into a separate cooling unit, in which case the monitoring and control device 84 preferably has an output terminal which is provided for connection to the cooling unit and to which, for example, a digital information signal concerning the level of the lamp voltage is applied.

Figure 2:
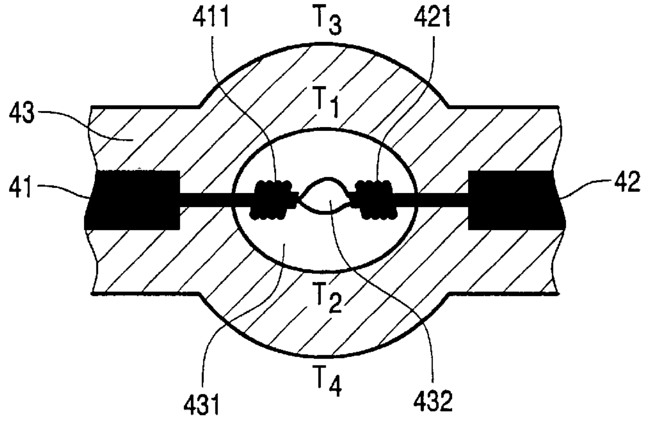
FIG. 2 shows a temperature distribution which stabilizes itself without cooling in the region of the burner space of the electrodes.

To clarify the operation of the cooling according to the invention, the region of the burner space (or discharge space) 431 of the electrode arrangement 4 will first be discussed in detail with reference to FIG. 2. FIG. 2 shows the mutually opposed regions of the electrodes 41, 42 and their tips 411, 421 which extend into the burner space 431 of the lamp bulb 43 and between which a light arc 432 is formed in the operational state of the lamp.

In this situation, the burner space 431 and the surrounding regions of the lamp bulb 43 are heated to various extents. The highest temperature T1 of the lamp bulb occurs at the upper inner side of the burner space 431 with the lamp in the operational condition, while the temperature T2 at the opposite, lower inner side of the burner space is lower than T1. Owing to the temperature gradient across the wall of the burner space, which is usually made of quartz glass, the temperature T3 at the upper outer side of the burner space will be lower than the temperature T1 at the inner side in the same location, but it still is the highest temperature at the outer side of the burner space. Finally, again, the temperature T4 at the lower outer side of the burner space will be lower than the temperature T2 at the lower inner side. The locations mentioned above have been referenced T1 to T4 in the Figure. The following relationships thus obtain: $T2<T1$, $T1>T3$, and $T2>T4$.

It is to be taken into account in the design of the lamp and in optimizing the luminous efficacy that these temperatures must comply with the following requirements.

The highest temperature T1 at the upper inner side of the burner space must not be so high that there is a risk of devitrification of the quartz glass. The lowest temperature T2 at the lower inner side of the burner space, on the other hand, must be so high that the mercury is not deposited there, but remains in the vapor phase. It is true for the difference $T1-T2$ between these temperatures that it is determined by convection and heat transport in the hot plasma. This means that the difference is proportional to the gas pressure in the burner space and accordingly represents a critical quantity, in particular in the case of UHP lamps.

To achieve the characteristics and advantages of the lamp according to the invention mentioned further above, a gas pressure (mercury vapor pressure) which is as high as possible is aimed for. This pressure is dependent on the temperature T of the coldest spot in the lamp interior in accordance with the following equation: $p_{Hg}[\text{bar}]=2{,}5*10^5*e^{-8150K/T}$. Accordingly, a temperature T of the coldest spot of 150 K is necessary already if a pressure of, for example, 200 bar is to be achieved.

The increase in the gas pressure is thus achieved through an increase in the temperature of the coldest spot in the lamp interior. If a lamp is to be capable of operation at such an increased power level, according to the invention, the cooling arrangement is constructed and dimensioned such that a devitrification of the lamp bulb is prevented without the filling gas condensing.

Figure 3:
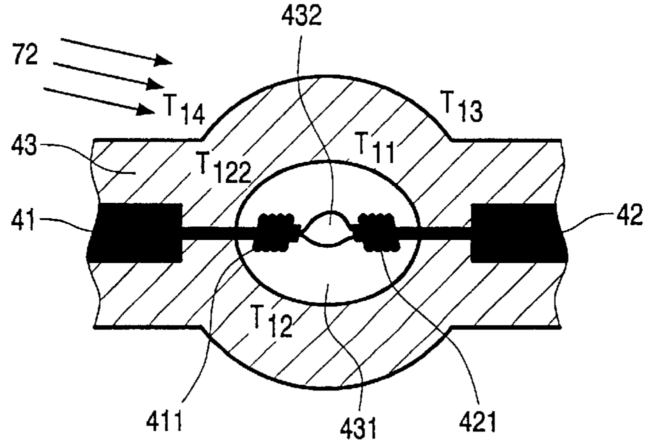
FIG. 3 shows a temperature distribution in the region of the burner space of the electrodes in the case of a cooling according to the invention.

The cooling according to the invention complies with these requirements and boundary conditions in particular through the construction and arrangement of the air channel 7 and its outlet nozzle 71. An air flow 72 as shown by the arrow in FIG. 3 is aimed obliquely at the region above the burner space 431 with this cooling. This leads to a change in the temperature distribution. The highest temperature T3 at the outer side of the burner space is reduced to a temperature T13 by the cooling, and is simultaneously shifted in the flow direction at the outside. The highest temperature T1 at the inner side of the burner space is correspondingly reduced to a temperature T11 and shifted in the flow direction. The lowest temperature T14 at the outer side of the burner space is present where the air flow hits the lamp bulb 43. Inside the burner space 431, at the lower side thereof, the temperature T12 shifted against the flow direction can be found as the lowest temperature or, in the case of a particularly strong air flow, the temperature T122 shifted against the flow direction towards the upper side of the burner.

It is possible with the cooling arrangement according to the invention to increase the lamp power for a given, unchanged geometry without the highly critical highest temperature T1 at the upper inner side of the burner space rising as a result. This does not interfere with the useful light cone even in the case in which the temperature T11 were to rise and cause a local devitrification of the lamp bulb, owing to unforeseen circumstances, because said devitrification would lie in a region shielded by the electrodes, as can be seen in FIG. 3.

Owing to the increased lamp power, the temperature T2 of the coldest spots in the burner space does not drop, in spite of the additional cooling. No condensation of mercury accordingly arises over a wide parameter range. A simultaneous adjustment of the cooling flow and of the lamp power is essential here, the cooling flow being controlled in general in dependence on the lamp power. If the lamp were only cooled (also when this cooling is aimed at the upper side) without an increase in the power, the mercury would condense immediately, in particular in the lamps with saturated gas filling used here, so that the properties of the lamp would deteriorate to an undesirable degree.

Comparative experiments were performed for this purpose, in which a UHP lamp dimensioned for a power rating of 100 W was operated for more than 4000 hours at an increased power of 150 W. A strong devitrification was observed after a few hundred hours already without the cooling according to the invention, whereas no devitrification could be detected with the cooling according to the invention.

It was furthermore shown that a UHP lamp dimensioned for a power rating of 100 W could even be operated at 200 W without the temperatures inside the burner space exceeding the critical limits. The same results were found for a UHP lamp dimensioned for 150 W, which was operated at 350 W with the cooling arrangement according to the invention. The overall result was that the maximum (increased) power of the lamps could be raised to well above 300 W without the other lamp properties being adversely affected. In general, the output power of the lamps can be increased by a factor of 1.5 to approximately 3 if the cooling arrangement is used. It may furthermore be useful to adapt the dimensions of the electrodes to the possible higher currents.

It was further shown that an air flow of between 1 and 20 l per minute, and even a comparatively weak air flow of approximately 1 to 10 l per minute, was sufficient already for achieving a substantial cooling effect. The more accurately the air flow is aimed and focused on the upper side of the burner space, the smaller the required air flowrate necessary for achieving a cooling. To keep the required air flowrate as small as possible, therefore, it makes sense to use a nozzle 71 whose diameter narrows in the direction towards the outlet. Inner diameters of between 0.5 and 5 mm, in particular, between 1.6 and 4 mm, were found to be advantageous in this respect. It is alternatively possible to use a simple tube with a diameter of between 1 and 5 mm without nozzle.

The source 83 generating the air flow may be a simple fan, a radial blower, or a small pump which is dimensioned such that the required pressure or the required flowrate is achieved. It was found that an air pressure of the order of 50 Pa is required at the inlet of the air channel 7 shown in FIG. 1, which channel is closed off with a nozzle 71 and has a length of approximately 150 mm. A pressure of approximately 100 Pa will generally be sufficient if further losses, for example caused by an upstream air filter, are taken into account.

Since the lamp bulb can be smaller when the cooling arrangement according to the invention is used, the switch-on duration necessary for obtaining approximately 30% of the operational light output is considerably shortened. To achieve this, the cooling arrangement is preferably not switched on until the moment the lamp voltage has exceeded a given minimum value.

A further advantage of this cooling arrangement is that the gas (mercury) condenses comparatively quickly, and thus the interior gas pressure drops comparatively quickly, in the case in which the cooling is maintained, for example for approximately 10 to 30 seconds, after switching-off of the lamp. Condensation then does not take place adjacent the electrodes, but against the inner wall of the burner space 431, i.e. mainly in that region in which the air flow acts on the lamp bulb 43. The result of this is that a renewed ignition at a comparatively low ignition voltage is possible already a few seconds after switching-off of the lamp.

A cooling which is as intensive as possible, and accordingly a strong air flow, is necessary for achieving an output power which is as high as possible and a high operating pressure of the lamp, given a certain dimensioning of the lamp bulb 43 and of the burner space 431. A limit is set for this, however, by the condensation of mercury in the burner space 431. It was found that the start of the condensation in the coldest spot in the burner space, which need not necessarily be at the lower side thereof, can be observed through monitoring of a drop in the lamp voltage. It is possible in this manner to control the air flow through a measurement and feedback of the lamp voltage obtained by the monitoring and control device 84 to the second control circuit 82 such that this air flow is indeed as strong as possible, but not so strong that a condensation occurs which will detract from the lamp properties, given a certain light output of the lamp adjusted with the first control circuit 81. Inversely, the light output of the lamp can thus be maximized, a stable operating condition adjusting itself thanks to the feedback.

A further advantage of the combination of the lamp according to the invention with the power supply unit 80 of the kind mentioned above arises in the operation of the lamp with different light outputs. The optimum operational conditions (gas pressures) in the interior of the burner space can be maintained at all times, in particular in the case in which the lamp is dimmed, by means of a suitable reduction in the cooling. This has the result that the properties of the lamp, in particular as regards the color spectrum of the radiated light, are not impaired, also in the case of a reduced light output. The useful dimming range of UHP lamps according to the invention, which amounts to no more than approximately 80% of the maximum light output in known UHP lamps, is widened to a range of down to 40% or even lower in UHP lamps according to the invention, because a condensation of mercury can be prevented to a high degree through a suitable reduction or switching-off of the cooling in dependence on an observed drop of the voltage across the lamp.

To prevent mercury entering the environment in the case of a mechanical defect of the lamp bulb, the monitoring and control device 84 may also be constructed such that an interruption of the lamp current accompanying such a defect is detected, whereupon the source 83 generating the air flow is switched off, and possibly a suitable diaphragm device (not shown) is moved in front of the air vents 31, 32 of the reflector housing 1.

What is claimed is:

1. A high-pressure gas discharge lamp with a cooling arrangement, wherein the lamp can be operated at an increased power level such that an increased gas pressure is generated by an increase in the temperature in the lamp interior, while the cooling arrangement is positioned and dimensioned such that a devitrification of the lamp bulb and a condensation of the filling gas are substantially prevented at said increased power level.

2. A high-pressure gas discharge lamp as claimed in claim 1, wherein the cooling arrangement is controlled in dependence on the power dissipated by the lamp.

3. A high-pressure gas discharge lamp as claimed in claim 1, wherein the cooling arrangement is formed by means for generating a flow of a cooling agent and directing said flow to a region of the lamp bulb which has the highest temperature.

4. A high-pressure gas discharge lamp as claimed in claim 3, wherein the cooling arrangement comprises an air channel and an air pressure source connected thereto for generating the flow of cooling agent, which flow is directed to a region which is situated above mutually opposed electrode tips of an electrode arrangement when the lamp is in an operational position.

5. A high-pressure gas discharge lamp as claimed in claim 4, wherein the air channel is restricted by a nozzle narrowing toward the outlet of the channel to an internal diameter of between 0.5 and 5 mm.

6. A high-pressure gas discharge lamp as claimed in claim 4, wherein the air pressure source is constructed such that an air flow with a flowrate of between 1 and 20 l per minute can be conducted through the air channel.

7. A lighting unit comprising:

a high-pressure gas discharge lamp with a cooling arrangement, wherein the lamp can be operated at an increased power level such that an increased gas pressure is generated by an increase in the temperature in the lamp interior, while the cooling arrangement is positioned and dimensioned such that a devitrification of the lamp bulb and a condensation of the filling gas are substantially prevented at said increased power level; and a power supply unit for operating the lamp, wherein the power supply unit comprises a first control circuit for supplying the lamp with a power at which an increased gas pressure is generated through an increase in the temperature in the lamp interior, the first control circuit comprising an output terminal to which an information signal relating to the level of the lamp voltage is applied and which is arranged so as to be connected to a second control circuit for operating a source which generates the flow of cooling agent in dependence on the level of the lamp voltage such that both a devitrification of the lamp bulb and a condensation of the filling gas are substantially prevented.

8. A lighting unit as claimed in claim 7, wherein the power supply unit comprises the second control circuit for operating the source which generates the flow of cooling agent.

9. A lighting unit as claimed in claim 7, wherein the power supply unit comprises a monitoring and control device by means of which the lamp voltage dropping across the lamp is detected and by means of which the second control circuit is controlled in dependence on a drop or rise in said voltage such that the flow of cooling agent generated by the source is reduced or increased to the extent that substantially no condensation of the filling gas in the lamp and no devitrification of the lamp bulb take place.

10. A lighting unit as claimed in claim 9, wherein the light output of the lamp can be dimmed with the first control circuit, whereupon the flow of cooling agent can be reduced for a medium dimming level and can be switched off for a high dimming level.

11. A lighting unit as claimed in claim 9, wherein the monitoring and control device controls the second control circuit such that the flow of cooling agent is not switched on after switching-on of the lamp until the moment the lamp voltage exceeds a given minimum value.

12. A lighting unit as claimed in claim 9, wherein the monitoring and control device controls the control circuit such that the flow of cooling agent is maintained for a given time period after switching-off of the lamp.

13. A lighting unit as claimed in claim 9, wherein the monitoring and control device detects the lamp current and, in the case of an interruption of the lamp current, controls the second control circuit such that the flow of cooling agent is switched off.

14. A lighting unit as claimed in claim 7, wherein the flow of cooling agent is directed to a region of the lamp bulb which has the highest temperature.

15. A lighting unit as claimed in claim 7, wherein the cooling arrangement comprises an air channel and an air pressure source connected thereto for generating the flow of cooling agent, which flow is directed to a region which is situated above mutually opposed electrode tips of an electrode arrangement when the lamp is in an operational position.

16. A lighting unit as claimed in claim 15, wherein the air channel has a nozzle narrowing toward an outlet of the air channel to an internal diameter of between 0.5 and 5 mm.

17. A lighting unit as claimed in claim 15, wherein the air pressure source is constructed such that an air flow with a flow rate of between 1 and 20 l per minute can be conducted through the air channel.

18. A high-pressure gas discharge lamp comprising a cooling arrangement, wherein the lamp can be operated at an increased power level such that an increased gas pressure is generated by an increase in the temperature in the lamp interior, the cooling arrangement directing a flow of cooling agent toward an outer surface of a wall of the lamp enclosing a burner space, one or more electrodes being arranged in the burner space, and a temperature difference between two points on a surface of the wall being maintained in operation of the lamp, the temperature difference corresponding to a second temperature difference between a first temperature of the wall at which devitrification of the wall occurs and a second temperature of the wall at which a condensation of a filling gas of the lamp is substantially prevented.

19. A high-pressure gas discharge lamp as claimed in claim 18, wherein the cooling arrangement comprises a channel and a pressure source connected thereto for generating the flow of cooling agent, which flow is directed, when the lamp is in an operational position, to a region which is situated above a tip of one of the one or more electrodes and the tip of a second electrode.

20. A high-pressure gas discharge lamp as claimed in claim 19, wherein the channel is restricted by a nozzle with a smallest internal diameter between 1.6 and 4 mm.

21. A high-pressure gas discharge lamp as claimed in claim 19, wherein the pressure source is constructed such that air at a flow rate between 1 and 10 l per minute can be conducted through the channel.

* * * * *